(12) United States Patent
Makita et al.

(10) Patent No.: US 7,508,108 B2
(45) Date of Patent: Mar. 24, 2009

(54) AC MOTOR

(75) Inventors: Shinji Makita, Kakamigahara (JP);
Masayuki Nashiki, Komaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/410,030

(22) Filed: Apr. 25, 2006

(65) Prior Publication Data

US 2006/0244337 A1 Nov. 2, 2006

(30) Foreign Application Priority Data

Apr. 28, 2005 (JP) ............... 2005-132251

(51) Int. Cl.
*H02K 1/00* (2006.01)
(52) U.S. Cl. .............. 310/216; 310/49 R; 310/257; 310/164; 310/198
(58) Field of Classification Search .......... 310/49 R, 310/257, 164, 156.45, 198, 216
See application file for complete search history.

(56) References Cited

U.S. PATENT DOCUMENTS

| | | | | |
|---|---|---|---|---|
| 3,549,918 | A * | 12/1970 | Hout Henricus Marinus Van et al. ............... 310/49 R |
| 4,899,072 | A * | 2/1990 | Ohta ................. 310/49 R |
| 6,060,800 | A * | 5/2000 | Suzuki et al. .......... 310/49 R |
| 6,121,712 | A * | 9/2000 | Sakamoto ............. 310/254 |
| 6,153,953 | A * | 11/2000 | Isozaki et al. .......... 310/49 R |
| RE37,576 | E * | 3/2002 | Stephens et al. ......... 310/254 |
| 6,512,319 | B1 | 1/2003 | Horng et al. |
| 6,617,739 | B1 * | 9/2003 | Kinoshita .............. 310/198 |
| 6,765,321 | B2 | 7/2004 | Sakamoto |
| 2002/0190585 | A1 * | 12/2002 | Sakamoto ............. 310/49 R |
| 2003/0080631 | A1 * | 5/2003 | Kageyama et al. ......... 310/12 |
| 2005/0012427 | A1 | 1/2005 | Seki et al. |
| 2005/0099082 | A1 | 5/2005 | Nashiki |

FOREIGN PATENT DOCUMENTS

| | | |
|---|---|---|
| DE | 43 17 817 C1 | 6/1994 |
| DE | 201 15 194 U1 | 1/2002 |
| JP | A-56-12852 | 2/1981 |
| JP | A 06-261513 | 9/1994 |
| JP | A-10-304642 | 11/1998 |
| JP | A-2003-0095500 | 1/2003 |
| JP | A-2004-015998 | 1/2004 |
| JP | A 2005-020981 | 1/2005 |
| JP | A-2005-094876 | 4/2005 |
| JP | A 2005-160285 | 6/2005 |

* cited by examiner

*Primary Examiner*—Burton Mullins
*Assistant Examiner*—Alex W Mok
(74) *Attorney, Agent, or Firm*—Oliff & Berridge, PLC

(57) ABSTRACT

A brushless AC motor has a rotor, N stator pole group, and plural loop-configuration stator windings. The rotor has magnetic poles with alternating N poles and S poles circumferentially disposed at equal interval. The stator has plural stator poles divided to N stator pole groups. Each group is formed circumferentially on the stator with each of adjacent pairs of the groups mutually differing in circumferential position by a desired amount. The stator windings are formed circumferentially on the stator, with each winding disposed immediately adjacent to a corresponding one of the stator pole groups, with respect to a rotor axis direction. As an example, the stator pole has an approximate parallelogram shape in which a top side and a base side of the stator pole in axis direction of the stator has an approximately same width in rotational direction, and the positions of the top side and the base side is shifted in rotational direction to each other.

12 Claims, 11 Drawing Sheets

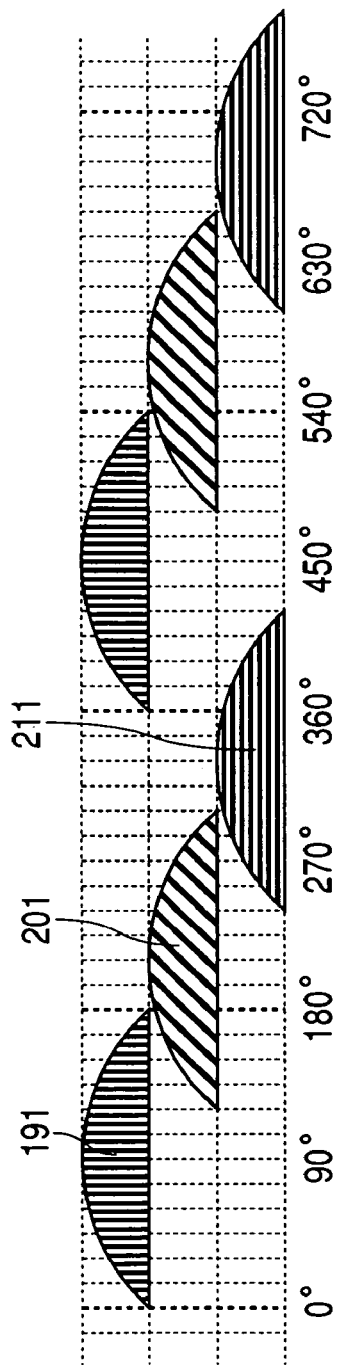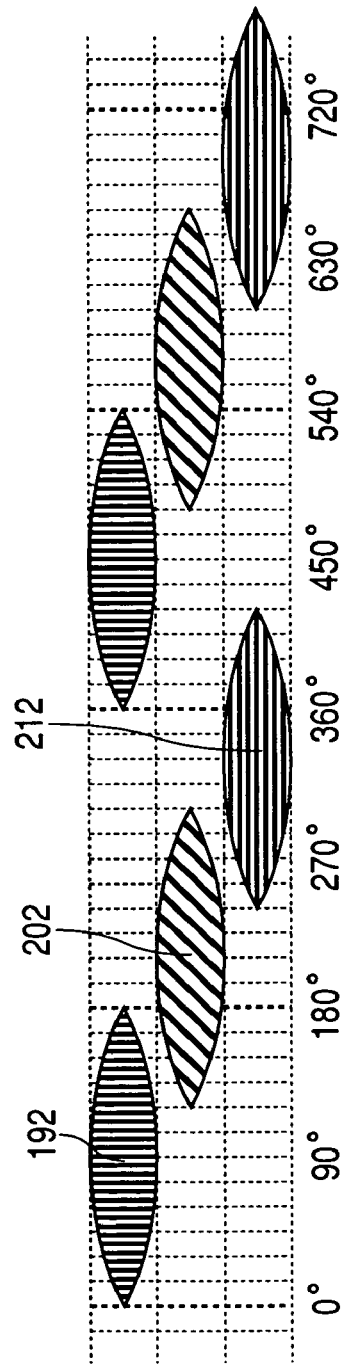

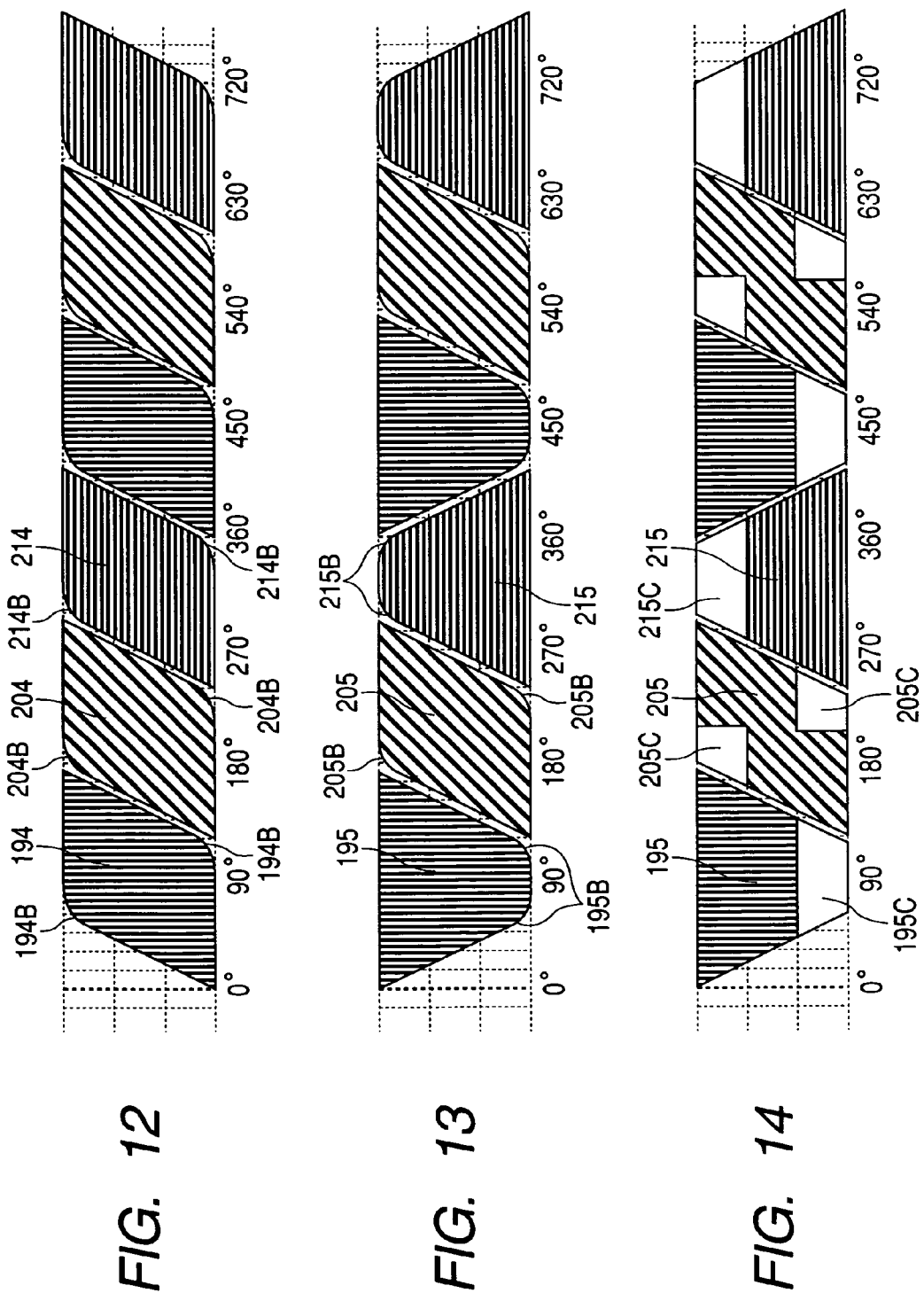

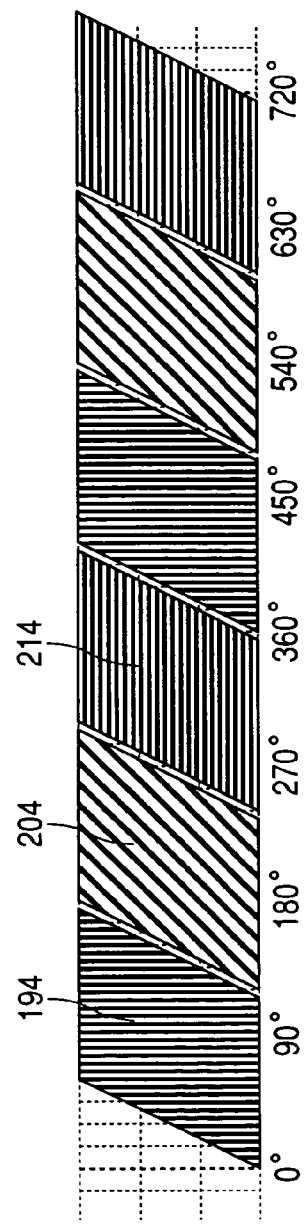
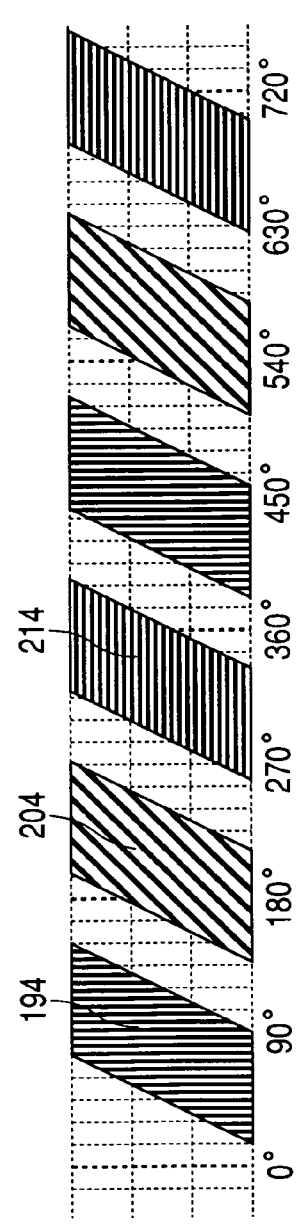
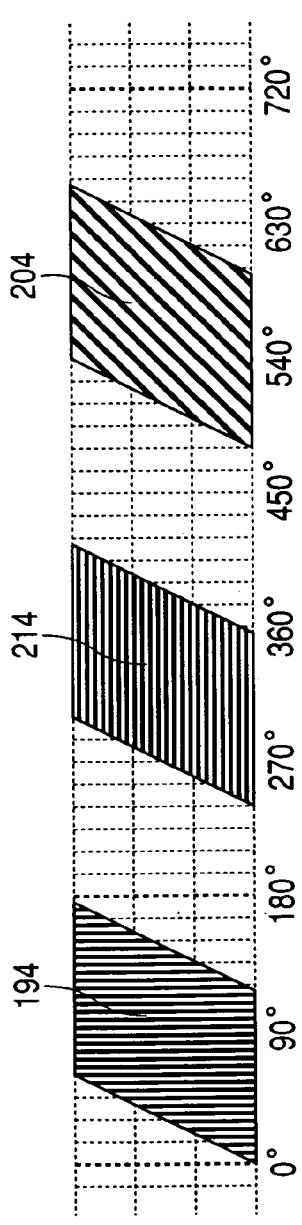
FIG. 17A
FIG. 17B
FIG. 17C

AC MOTOR

CROSS-REFERENCE TO RELATED APPLICATIONS

This application is related to and claims priority from Japanese Patent Application No. 2005-132251 filed on Apr. 28, 2005, the contents of which are hereby incorporated by reference.

BACKGROUND OF THE INVENTION

1. Field of the Invention

The present invention relates to an AC motor, suitable for installation in an automobile, a motor truck, and so on.

2. Description of the Related Art

In the prior art, types of synchronous AC motor, and in particular types of brushless AC motor, are known which have stator windings formed as closely packed layers of conductors that are wound around the stator poles, for example as described in Japanese Patent Laid-open publication No. JP H6-261513 (see page 3, and FIGS. 1 to 3 thereof).

Such a configuration of conventional brushless motor disclosed in the Japanese Patent Laid-open publication No. H6-261513 is widely used at the present time in both industrial and domestic applications. However such a brushless motor has a complex construction, due to the need to form windings around each of the respective stator poles, with each of the windings being disposed in the interior of a stator slot. Hence, the manufacturing productivity is low. It is further difficult to produce such a type of brushless motor in a compact size, or to manufacture it at low cost.

In order to solve the above conventional problem, the inventor according to the present invention has invented an improved technique "A synchronous AC motor having stator windings formed as loop coils, and control apparatus for the AC motor" disclosed in the Japanese Patent Laid-open publication No. JP 2005-160285. This improved technique shows a synchronous AC motor, and in particular a brushless motor, having a simple configuration and ease of manufacture, which can be made compact in size, can operate with high efficiency, and has low manufacturing cost. The technique has further provided a control apparatus for such an AC motor. This synchronous AC motor has a rotor, a stator, and a plurality of loop-configuration stator windings. The rotor has a plurality of magnetic poles formed circumferentially, with N poles and S poles successively alternating. The stator has a plurality of stator poles formed around its inner circumference, arranged as N stator pole groups (where N is a plural integer) with each of adjacent pairs of the N stator pole groups mutually differing in circumferential position and axis position by an identical amount. The plurality of loop-configuration stator windings are formed circumferentially on the stator, with each loop-configuration stator winding are disposed immediately adjacent to a corresponding one of the N stator pole groups (with respect to the rotor axis direction).

Use of such loop-configuration stator windings is made possible by the fact that with a conventional form of stator winding, with each winding being wound a number of times around each of a plurality of stator poles in succession, those stator winding portions which are located at positions intermediate between adjacent poles produce magnetizing forces that mutually cancel, since respective currents of equal value and opposite direction flow through these portions of the stator windings. Hence, this is equivalent to a condition in which no current flows through these portions of stator windings, so that these can be omitted. Use of loop-configuration stator windings according to the improved technique has the advantages that the amount of copper required to form the stator windings can be substantially reduced, and in addition, increased output torque and increased efficiency can be achieved for the motor. Furthermore the manufacturing cost can be lowered, e.g., with manufacture being simplified since it is not necessary to coil the stator windings around the stator poles, and the motor can be made lighter in weight. Moreover, due to the fact that the aforementioned winding portions that are located between each pair of adjacent stator poles in a prior art type of synchronous AC motor are omitted, it would be possible to increase the number of stator poles of a synchronous AC motor according to the improved technique, by comparison with a prior art type of such motor.

Moreover, due to the fact that the locations of the stator poles can be distributed in a balanced manner, along both the rotor axis direction as well as around the inner circumference of the stator, as opposed to having a small number of stator poles that are located along a single circumferential path, further advantages are obtained. Specifically, the forces of magnetic attraction acting on the stator by the rotor poles are applied in a distributed manner, thereby reducing the tendency for the stator to become deformed by these forces. Hence, vibration and noise which results from such deformation can be reduced.

The inventor has directed his attention that the output torque of the AC motor increases and the torque ripple thereof reduces according to a shape of stator poles, the AC motor having an improved shape of the stator poles is made of more compact size because of eliminating stator coil ends, and it is possible to have a high degree of freedom in shape and thereby to reduce cogging torque and torque ripple because of having 3-dimensional magnetic path.

SUMMARY OF THE INVENTION

The present invention has been achieved with the abovementioned demand in mind, and it is an object of the present invention to provide a new and improved an AC motor having a simple configuration and ease of manufacture, which can be made compact in size, capable of operating with a high efficiency, and has low manufacturing cost.

To achieve the above objects, the present invention provides an AC motor has a rotor, a stator, and a plurality of loop-configuration stator windings. The rotor has a plurality of magnetic poles, with alternating N (north) poles and S (south) poles circumferentially disposed at equal intervals. The stator has N stator pole groups. Reference character N designates a plural integer. Each stator pole group is formed circumferentially on the stator. Each stator pole group has a plurality of stator poles, with each of adjacent pairs of the N stator pole groups mutually differing in circumferential position by an identical amount. The plurality of loop-configuration stator windings are formed circumferentially on the stator, with each loop-configuration stator winding disposed immediately adjacent to a corresponding one of the N stator pole groups, with respect to an axial direction of the rotor. In the AC motor, an opposite face of the stator pole faced to the magnetic pole of the rotor is formed with an area having a distribution for smoothing a change rate of rotation of a magnetic flux flowing through the stator poles.

In the AC motor of the present invention, the windings of the loop-configuration are arranged or placed on a surface vertically to the axial direction of the rotor, and a magnetic path passing from the surface of the stator poles of a phase to the surface of the stator poles of another phase is formed in a 3-dimension space through the outer circumference of the stator. This configuration can provide the AC motor without any protrusive part of the windings in axial direction, namely eliminate any protrusive part of the windings in axis direction, and reduces the reluctance or magnetic resistance corresponding to the protrusive part. It is thereby possible to manufacture the AC motor with a compact size.

On assumption that the magnetic flux flows in a 3-dimensional space in the AC motor having the above configuration, it is possible to freely design the surface shape of the stator poles in the stator. Further, because the area of the stator poles faced to the rotor has a distribution for smoothing the change ratio of rotation of the magnetic flux passing through the stator poles, it is possible to reduce cogging torque and torque ripple.

According to another aspect of the present invention, an AC motor has a rotor, a stator, and a plurality of loop-configuration stator windings. The rotor has a plurality of magnetic poles, with alternating N (north) poles and S (south) poles circumferentially disposed at equal intervals. The stator has N stator pole groups. Reference character N designates a plural integer. Each stator pole group is formed circumferentially on the stator. Each stator pole group has a plurality of stator poles, with each of adjacent pairs of the N stator pole groups mutually differing in circumferential position by an identical amount and with a part of each stator pole mutually differing in axial position by an identical amount. The plurality of loop-configuration stator windings is formed circumferentially on the stator, with each of the loop-configuration stator windings disposed immediately adjacent to a corresponding one of the N stator pole groups, with respect to an axial direction of the rotor. In the AC motor, an axial length of an opposite face of the rotor faced to an opposite face of the stator through an air gap is longer than that of the stator.

It is thereby possible to reduce the magnetic leakage flux generated between adjacent stator poles and the phenomenon of roundabout way of the magnetic flux in a 3-dimensional space by forming the rotor whose length is longer in axis direction than that of the stator. This can determine the magnitude of the magnetic flux only by the surface area of the stator pole. The change rate of magnetic flux at the top side and the bottom side of the stator pole can be considered, like the change rate of magnetic flux in the other part of the stator pole. It is thereby possible to design an AC motor having reduced cogging torque and torque ripple with a simple configuration.

BRIEF DESCRIPTION OF THE DRAWINGS

A preferred, non-limiting embodiment of the present invention will be described by way of example with reference to the accompanying drawings, in which:

FIG. 5 is a developed circumferential view of another example of the inner periphery of the stator of the 3-phase brushless motor of FIG. 1;

FIG. 6 is a developed circumferential view of another example of the inner periphery of the stator of the 3-phase brushless motor of FIG. 1;

FIG. 12 is a developed circumferential view of another example of the inner periphery of the stator of the 3-phase brushless motor of FIG. 1;

FIG. 13 is a developed circumferential view of another example of the inner periphery of the stator of the 3-phase brushless motor of FIG. 1;

FIG. 14 is a developed circumferential view of another example of the inner periphery of the stator of the 3-phase brushless motor of FIG. 1;

FIGS. 17A and 17B are developed circumferential views of the inner periphery of the stator of the 3-phase brushless motor;

FIG. 17C is a developed circumferential view of another optimum example of the inner periphery of the stator of the 3-phase brushless motor according to the embodiment of the present invention;

DETAILED DESCRIPTION OF THE PREFERRED EMBODIMENTS

Figure 1:
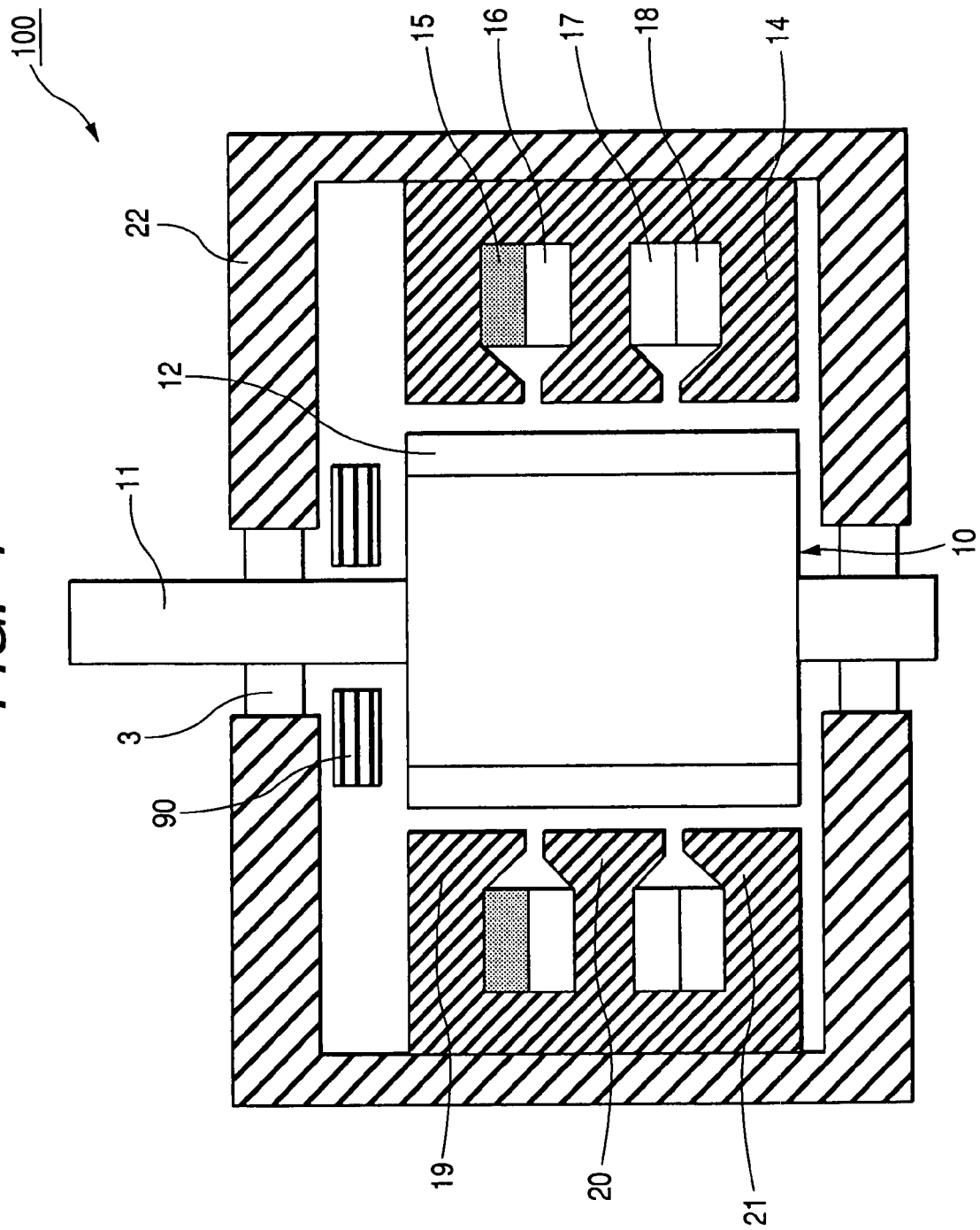
FIG. 1 is a cross-sectional view of a 3-phase brushless motor, taken in a plane passing through the rotor axis according to an embodiment of the present invention.

Hereinafter, various embodiments of the present invention will be described with reference to the accompanying drawings. In the following description of the various embodiments, like reference characters or numerals designate like or equivalent component parts throughout the several diagrams.

Embodiments

A description will now be given of a brushless motor applied to an AC motor according to the present invention with reference to diagrams.

FIG. 1 is a cross-sectional view taken along the motor shaft of an embodiment of a brushless motor, designated by numeral 100. This is a 3-phase 8-pole motor having a rotor shaft 11 mounted on bearings 3, a rotor 10 having permanent magnets 12, and a stator 14, with these being enclosed in a housing 22.

Figure 2:
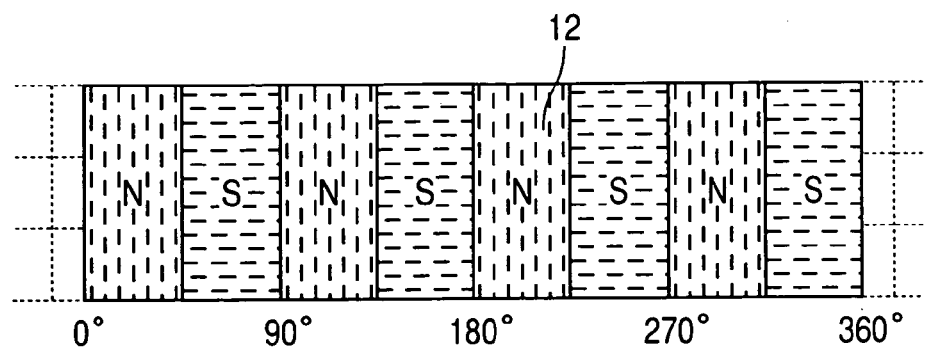
FIG. 2 is a developed circumferential view of the outer periphery of the rotor of the 3-phase brushless motor of FIG. 1.

The rotor 10 has the permanent magnets 12 disposed circumferentially around its periphery, with N poles and S poles arranged in successive alternation, as shown in the developed circumferential view of FIG. 2, taken around the outer periphery of the rotor 10. The 360 degree circumference (mechanical angle) of the rotor 10 is equivalent to an electrical angle of 1440 degrees.

Figure 3:
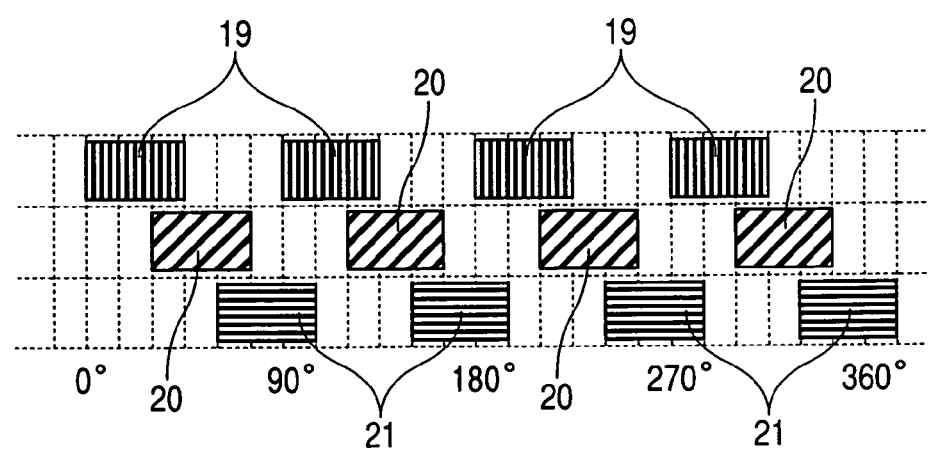
FIG. 3 is a developed circumferential view of the inner periphery of the stator of the brushless motor of FIG. 1, in particular, illustrating the position relationships between stator poles of the stator.

The stator 14 is provided with four U-phase stator poles 19, four V-phase stator poles 20, and four W-phase stator poles 21, each of which projects radially inward towards the periphery of the rotor 10. FIG. 3 is a developed circumferential view of the stator 14, illustrating the position relationships between these stator poles 19, 20, and 21 of the stator 14.

As shown in FIG. 3, the U-phase stator poles 19 are arranged at a regular spacing, around a common circumferential path. The V-phase stator poles 20 are similarly arranged around a common circumferential path, adjacent to that of the U-phase stator poles 19, and the W-phase stator poles 21 are also around a common circumferential path, adjacent to that of the V-phase stator poles 20. In the following, the set of four U-phase stator poles 19 will be referred to as the stator pole group 19, the set of four V-phase stator poles 20 as the stator pole group 20, and the set of four W-phase stator poles 21 as the stator pole group 21. Of these, the stator pole group 19 and the stator pole group 21, which are located at outer end positions (with respect to the direction of the rotor shaft 11) will be referred to as the edge position stator pole groups, while the stator pole group 20 will be referred to as the intermediate stator pole group.

As shown in FIG. 3, the U, V, and W stator pole groups 19, 20, 21 are respectively mutually displaced by a specific amount in the circumferential direction, and also along the rotor axis direction. In a concrete example, the amount of circumferential displacement is a (mechanical) angle of 30 degrees, which is equivalent to an electrical angle (i.e., phase difference) of 120 degrees, since the circumferential stator pole pitch (within each stator pole group) corresponds to a phase change of 360 degrees.

The pitch of the permanent magnets 12 (i.e., the angular displacement between two adjacent N poles, or between two adjacent S poles) corresponds to an electrical angle of 360 degrees. Similarly, as mentioned above, the pitch of the stator poles within each stator pole group is also equivalent to an electrical angle of 360 degrees.

Figure 4:
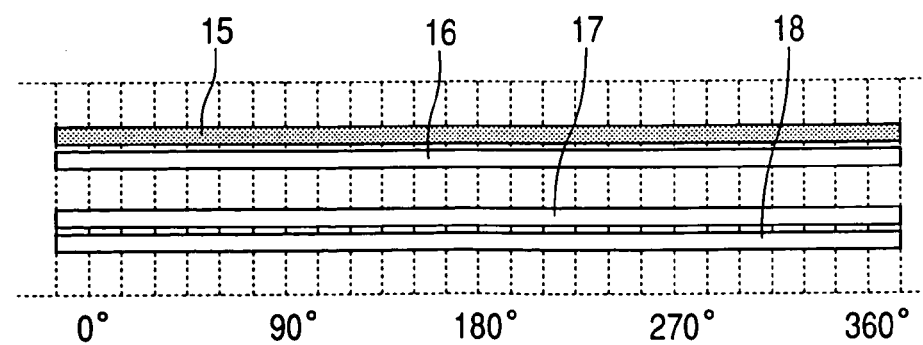
FIG. 4 is a developed circumferential view showing stator windings of the 3-phase brushless motor of FIG. 1.

A U-phase stator winding 15 and a V-phase stator winding 16 are disposed successively (along the rotor axis direction) between the stator pole group 19 and the stator pole group 20 of the stator 14, i.e., with the U-phase stator winding 15 and V-phase stator winding 16 being respectively adjacent to the stator pole group 19 and the stator pole group 20, while a V-phase stator winding 17 and a W-phase stator winding 18 are similarly successively disposed, with the V-phase stator winding 17 closely adjacent to the stator pole group 20 and the W-phase stator winding 18 closely adjacent to the stator pole group 21. FIG. 4 shows this configuration, namely shows a developed circumferential view for illustrating the manner in which these windings are arranged on the stator 14. Each of the U-phase stator winding 15, V-phase stator winding 16, V-phase stator winding 17 and W-phase stator winding 18 is formed with a loop configuration, and extends for 360 degrees around an inner circumference of the stator 14.

Three phase (3-phase) AC currents that successively differ in phase by 120 degrees, referred to in the following as Iu, Iv and Iw, flow in the U-phase stator winding 15, the V-phase stator winding 16, the V-phase stator winding 17 and the W-phase stator winding 18 respectively.

A direction of current flow in a phase winding (at any particular instant) that is clockwise (as seen looking along the direction of the motor shaft) will be arbitrarily designated as the positive direction of current flow, current flow in the counterclockwise direction being designated as the negative direction. It will be assumed that a negative current (−Iu) flows in the U-phase stator winding 15. In that case, a positive current (+Iv) flows in the V-phase stator winding 16, while a negative current (−Iv) flows in the V-phase stator winding 17, and a positive current (+Iw) flows in the W-phase stator winding 18. In FIG. 1, reference number 90 designates a position sensor.

The shape of each phase stator pole is described in detail in the Japanese Patent Laid-open publication No. JP 2005-160285, the explanation for them is therefore omitted here for brevity. Because the magnetic flux passing through the stator 14 flows along directions in a 3-dimensional space in the brushless AC motor having the above configuration, it would be possible to design the shape of surface of the stator freely.

When the surface area of each stator pole in the stator 14 to the electrical angle of the rotor 12 is formed with a sine-wave shape, the rate of change of the magnetic flux in the stator 14 to the rotation angle of the rotor 12 becomes a sine-wave shape. This configuration has a feature to reduce the cogging torque and the torque ripple.

In order to realize the feature, it would be preferred that the surface shape of each stator pole has a sing-wave shape or an approximate sing-wave shape with a width of 180 degrees in electric angle, for example, as shown in FIG. 5 and FIG. 6. That is, it would be acceptable that one side in the surface shape of each of the stator pole, the U-phase stator pole 191, the V-phase stator pole 201, and W-phase stator pole 211 in the stator 14 to the rotor 12, is formed in a line shape and the other side thereof is formed in a circular shape (see FIG. 5), or that both sides of the surface shape of each stator pole, U-phase stator pole 192, V-phase stator coil 202, and W-phase stator pole 212 in the stator 14 to the rotor 12, are formed in a circular shape (see FIG. 6).

Further, although FIG. 5 and FIG. 6 show that each phase is shifted in the axis direction of the rotor 12 and the stator 14, the concept of the present invention is not limited by the position in the shift direction.

FIG. 5 and FIG. 6 show ideal cases that the surface of each stator pole has the smooth sine-wave shape. It is actually difficult to form the surface of each stator pole with such a complicated smooth sine-wave shape. Further, in order to prevent the occurrence of interference between adjacent magnetic poles, it is necessary to form the magnetic poles with different positions, namely shifted to each other in the axis direction of the rotor 12. This introduces dead space in the stator 14 and it is thereby impossible to use the magnetic flux generated by the stator pole in the stator 14 effectively.

Figure 7:
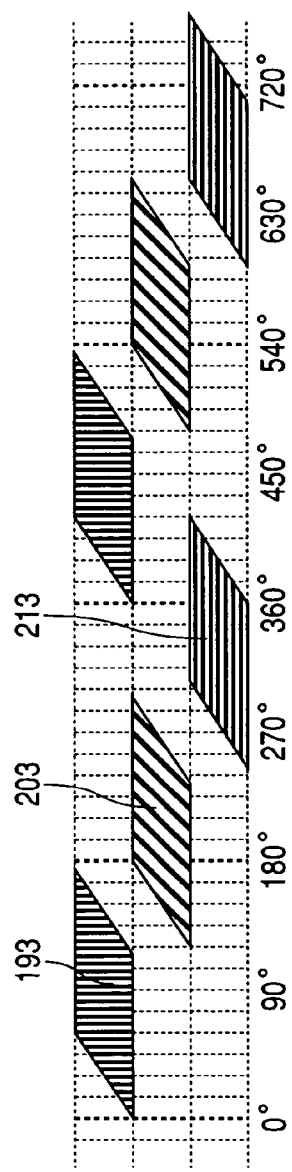
FIG. 7 is a developed circumferential view of another example of the inner periphery of the stator of the 3-phase brushless motor of FIG. 1.

In order to avoid this drawback, both the upper side and the bottom side of each of the stator poles 193, 203, and 213 are formed in a line and with a same width (see FIG. 7), and the rotational position of each winding of the upper side and the lower side of the stator pole is shifted to each other, for example by 60 degrees. This provides easy manufacturing to the stator pole of a parallelogram shape, as shown in FIG. 7. The rotational shifted angle of 60 degrees between the upper line and the bottom line of each stator pole can provide the maximum magnetic flux and the smallest higher-harmonic component in the change rate of the magnetic flux and can reduce cogging torque and torque ripple. Another rotational shifted angle can also reduce the cogging torque and the torque ripple. FIG. 7 shows clearly that the adjacent stator poles 193 and 203, the adjacent stator poles 203 and 213, . . . are overlapped in the range of 60 degrees.

Figure 8:
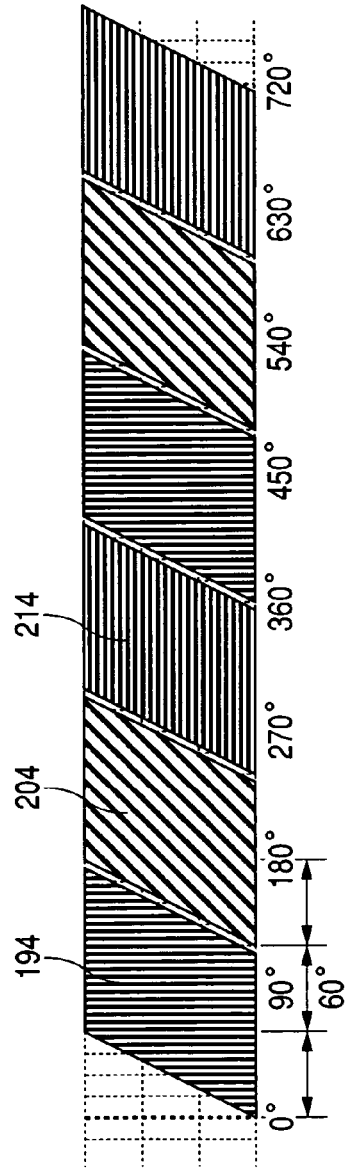
FIG. 8 is a developed circumferential view of another example of the inner periphery of the stator of the 3-phase brushless motor of FIG. 1.

The stator pole formed in such a parallelogram shape shown in FIG. 7 and satisfying the above conditions can avoid interference caused between adjacent stator poles 194, 204, and 214 even if each phase is extended in the axis direction to the utmost limit shown in FIG. 8. This configuration can provide the effect to use the maximum magnetic flux.

Further, the stator poles in each phase of the stator 14 having a same area can reduce the cogging torque and the torque ripple because of the balance in area between those phases.

Figure 9:
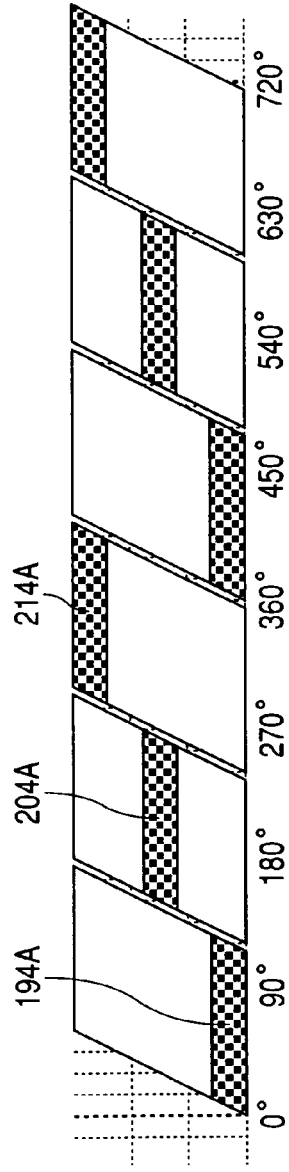
FIG. 9 is a sectional view showing magnetic path connecting the surfaces of the stator poles and the outer periphery of the rotor of the 3-phase brushless motor of FIG. 1.

On the contrary, when the surface of the stator pole has the shape shown in FIG. 8, because the magnetic paths 194A, 204A, and 214A (see FIG. 9) that connect the surfaces of the stator poles 194, 204, and 214 to the outer periphery of the stator 14 are limited by the stator windings formed with a loop-configuration and those magnetic paths are limited in area, in view of the sectional area of the magnetic path 194A, 204A, and 214A shown in FIG. 9 connected to the surface of the stator pole, the magnetic saturation often occurs.

Figure 10:
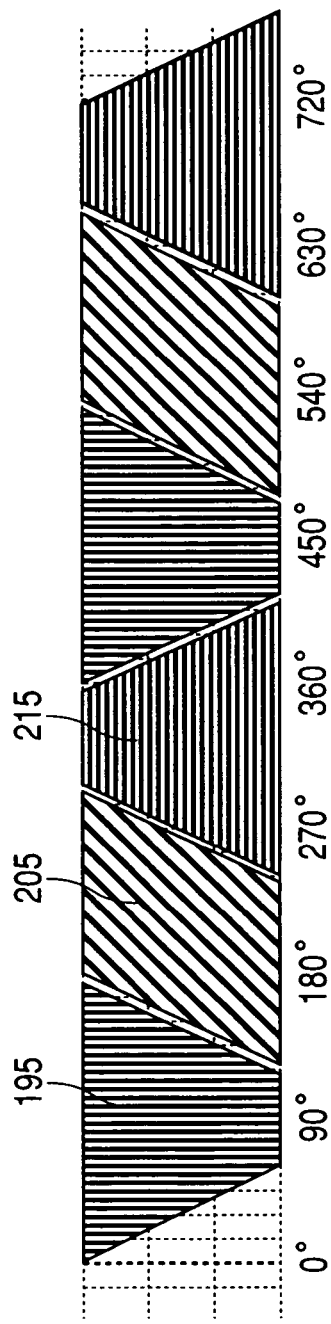
FIG. 10 is a developed circumferential view of another example of the inner periphery of the stator of the 3-phase brushless motor of FIG. 1.

It would be possible to avoid this drawback by the configuration shown in FIG. 10 of the combination of the stator poles 195 and 215 of a parallelogram and the stator pole 205 of a trapezoid.

Figure 11:
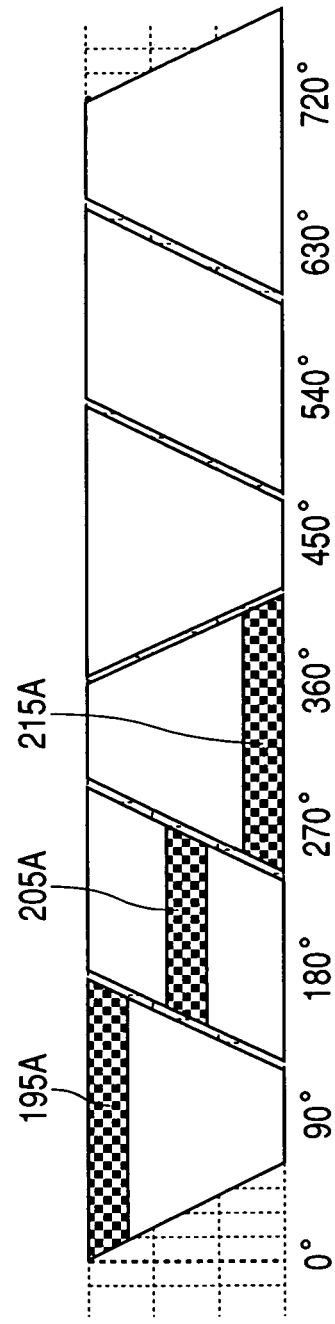
FIG. 11 is a sectional view showing magnetic path connecting the surfaces of the stator poles and the outer periphery of the rotor of the 3-phase brushless motor of FIG. 1.

The stator poles 195 and 215 has a trapezoid shape and the stator pole 205 has a parallelogram shape shown in FIG. 10 while maintaining or keeping the area of the magnet poles shown in FIG. 8. The stator pole 195 is reversed in arrangement to the stator pole 215, where the top side of the trapezoid of the stator pole 195 is switched in arrangement with the bottom side of the trapezoid of the stator pole 215. It would be thereby possible to have a increased sectional area of each of the magnetic paths 195A, 205A, and 215A while maintaining or keeping the total area of stator poles 195, 205, and 215 that is equal in area to the stator poles shown in FIG. 8. In the case shown in FIG. 10, because the parallelogram shape of the stator pole 205 is not changed, namely equal to the shape of the stator pole 204 shown in FIG. 8, it is necessary to increase the area of the magnetic path 205A of the stator pole 205 in the axis direction in order to keep or maintain the balance of the magnetic flux passing through the increased areas of the magnetic paths 205A and the 215A in the stator poles 195 as shown in FIG. 11.

Although the feature of the stator poles is explained only with the surface of the stator pole and the sectional area of the windings, the actual magnetic paths have a complex 3-dimensional shape. Therefore the magnetic paths can be easily formed by using the magnetic paths 195A and 215A of a trapezoid shown in FIG. 11.

As described above, the stator poles 191, 192, 201, 202, 211, and 212 having a similar sine-wave shape shown in FIG. 5 and FIG. 6 are better in consideration of cogging torque and torque ripple than the stator poles having the shape shown in FIG. 8 and FIG. 10. However, the stator poles having the shape shown in FIG. 8 and FIG. 10 are better in manufacturing and efficiency of magnetic flux than the stator poles 191, 192, 201, 202, 211, and 212 having a similar sine-wave shape shown in FIG. 5 and FIG. 6. The former shape shown in FIG. 8 and FIG. 10 can be easily formed when compared with the latter shape shown in FIG. 5 and FIG. 6

Furthermore, it should be better to relieve edge parts of each stator pole having the shape shown in FIG. 8 and FIG. 10 with chamfer or with radius in order to approaches a sine-wave shape and form. In consideration of the difference from the sine-wave shape, because the two corners, more closed to the center of the stator pole, in the four corners of the parallelogram shape or trapezoid shape are different in configuration from the sine wave shape, as shown in FIG. 12 and FIG. 13, at least the corners 194B, 195B, 204B, 205B, 214B, and 215B of the parallelogram or trapezoid shape are relieved with chamfer or with radius. This configuration can reduce the cogging torque and torque ripple.

In consideration of the shapes of the stator poles shown in FIG. 8 and FIG. 10, the surface of the stator pole becomes extremely longer in the longitudinal direction than in the lateral direction when it has a long dimension in axis direction or when the number of stator poles becomes large.

This shape causes a drawback in decreasing the strength of the stator and to make complicated magnetic paths connecting the surface of the stator pole with the stator winding. In order to reduce or avoid this drawback, it would be preferred to cut a part of the stator poles 195, 205, and 215. However, the length of the stator pole in longitudinal direction is not reduced, but the part of each stator pole in one phase to be cut is magnetically equal to that in another phase. For example, as shown in FIG. 14, two parts are cut, that is, one is the corner part 205C near to the center of the stator pole 205 in an approximate parallelogram and the other is the parts 195C and 215C, each width of which is shorter in rotational direction of the stator poles 195 and 215 having an approximate trapezoid. When the parts in those phases are cut by a same area, it is achieved to reduce the length of the stator pole in the axis direction while keeping the change rate of the magnetic flux in each phase. This configuration introduces both the easy manufacturing and high performance.

It would be possible to have a same or equivalent magnetic leakage flux between the adjacent stator poles when the length of the area having the minimum length of an air gap between the adjacent stator poles is formed with a same length in all of the stator pole pair, for example, between the adjacent stator poles 195 and 205, and between the adjacent stator poles 205 and 215. This configuration can also reduce the cogging torque and torque ripple. It would be further possible to reduce the magnitude of the magnetic leakage flux and to increase the torque of the brushless AC motor, by reducing the length of this area and the opposed area between the adjacent stator poles as small as possible.

The various modifications described above according to the embodiment of the present invention are explained under the condition in which the magnitude of the magnetic flux of the stator poles is determined by the surface area of each stator pole. However, because there is presence of a magnetic leakage flux in a 3-dimensional space between adjacent stator poles in an actual brushless AC motor, the magnitude of the magnetic flux cannot be determined only by the surface area of the stator pole.

Figure 15:
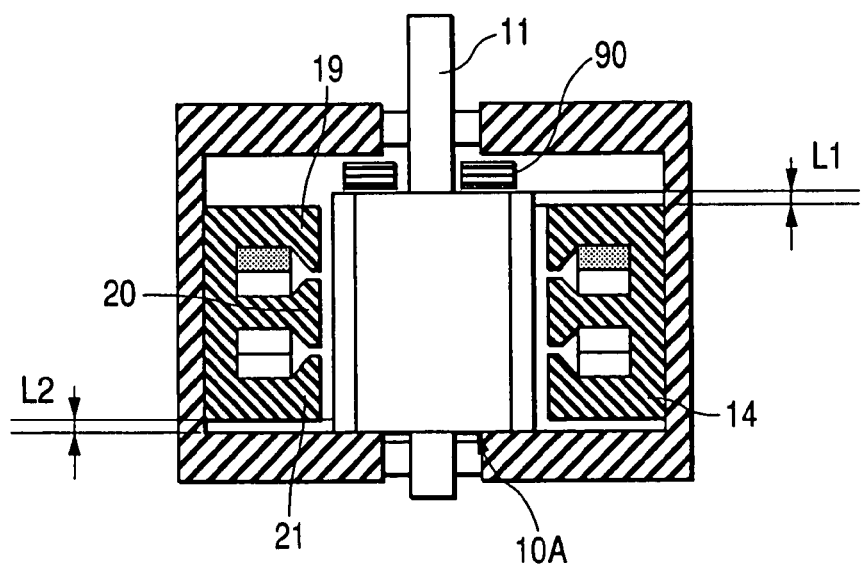
FIG. 15 is a cross-sectional view of another example of the 3-phase brushless motor according to the embodiment of the present invention.

The present invention provides an improved manner in reducing or eliminating the influence in a roundabout way of the magnetic flux in a 3-dimensional space between adjacent stator poles in an actual brushless AC motor. In order to reduce or eliminate the above influence, FIG. 15 shows the manner to form the brushless AC motor in which the length of the rotor 10A in its axis direction is longer than that of the stator 14 by L1 (top end) and L2 (bottom end). Although it is acceptable to have the relationship of the lengths L1>L2 or L1<L2, the optimum case is the condition of L1=L2. The brushless AC motor according to the present invention has the stator poles whose position is different per phase in the axis direction of the stator. In this case, there is a possibility of causing an unbalanced change rate of the magnetic flux in each phase by the presence of a roundabout way of the magnetic flux in a 3-dimensional space. In order to eliminate this, when the length of the rotor 10A is formed longer in axis direction than that of the stator 14, it becomes possible to obtain the change of the magnetic flux at the upper end and the lower end like the other parts in the stator poles 19, 20, and 21.

It would be thereby possible to design an AC motor having the stator poles of a simple configuration with a small cogging torque and reduced torque ripple.

Figure 16:
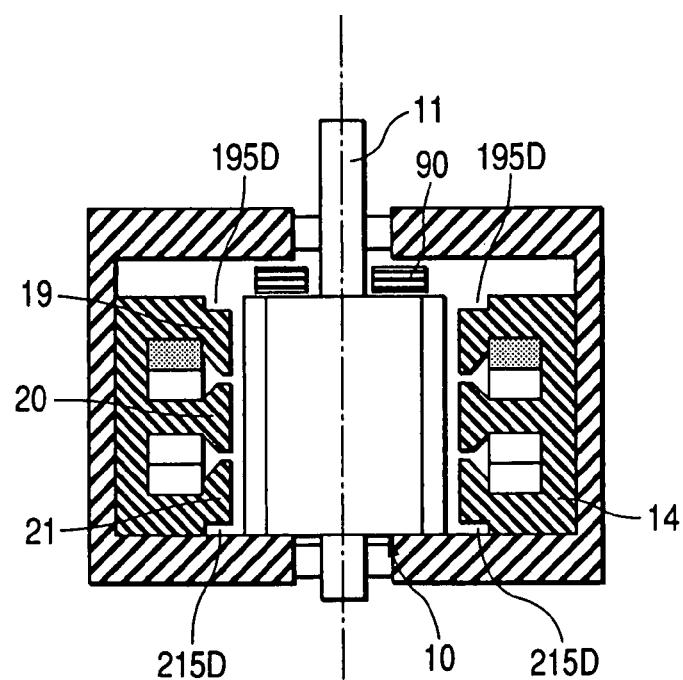
FIG. 16 is a cross-sectional view of another example of the 3-phase brushless motor according to the embodiment of the present invention.

It is further acceptable to form the brushless AC motor shown in FIG. 16 in which the opposite faces of the rotor 10 are longer in the axis direction of the rotor 10 than the step parts 195D and 215D of the stator 14. That is, as shown in FIG. 16, the opposite faces of the stator 14 have the step parts 195D and 215D and the remaining part. It is also acceptable that the entire length of the stator 14 is equal or longer in axis direction than that of the rotor 10 and the remaining part other than the step parts 195D and 215D is shorter than the rotor. It would be possible to reduce a dead space and increase the area for the windings and thereby to increase the output torque of the AC motor when compared with the configuration in which the rotor is longer than the stator in axis direction shown in FIG. 15. It would be further possible to obtain approximately no magnetic leakage flux between the rotor 10 and the longer area of the stator 14 to the rotor 10 when the length of the opposite faces is formed twice or more of an air gap width.

Next, a description will now be given of the manner to reduce the influence of magnetic leakage flux caused between adjacent stator poles.

In case of a small-sized motor or a large number of stator poles, there is a possibility not to have a large air gap between adjacent stator poles. For example, it is more preferred to increase the width of each stator pole as large as possible and to decrease an air gap between adjacent stator poles as small as possible in an ideal case shown in FIG. 17A, in consideration of the utilization factor of the magnet and the magnet saturation. However, when the inside diameter of the stator is extremely small, and the number of stator poles is large, the configuration shown in FIG. 17A has a very small air gap between adjacent stator poles and increases the magnetic leakage flux. As a result, the magnitude of the magnetic leakage flux is increased, in particular, at a start-up of the AC motor. This leads the phenomenon that the output torque of the AC motor is not increased even if a large current flows.

The case shown in FIG. 17B cannot solve the above drawback because the width of each stator pole must be decreased when the air gap between adjacent stator poles is increased under the same-number stator poles. This case shown in FIG. 17B also reduces the output torque of the AC motor.

In order to avoid or solve the above drawback, it would be preferred to reduce the number of stator poles. For example, as shown in FIG. 17C, A half-number of the stator poles increases the width of an air gap between adjacent stator poles adequately without reducing the width of each stator pole. In addition, it is necessary to increase twice the output torque generated in each stator pole when the number of the stator poles is reduced in half. However, it is impossible to increase the output torque twice or more when each stator pole has a small inside diameter and the stator has a large number of stator poles.

As described above, it is possible to reduce the cogging torque and torque ripple by shifting the position of each stator pole in rotational direction when the adjacent stator poles have a sufficient air gap thereof. In particular, it is possible to reduce the cogging torque and torque ripple while suppressing the reduction of the output torque when the position of each stator pole is shifted by 30 degrees.

Figure 18:
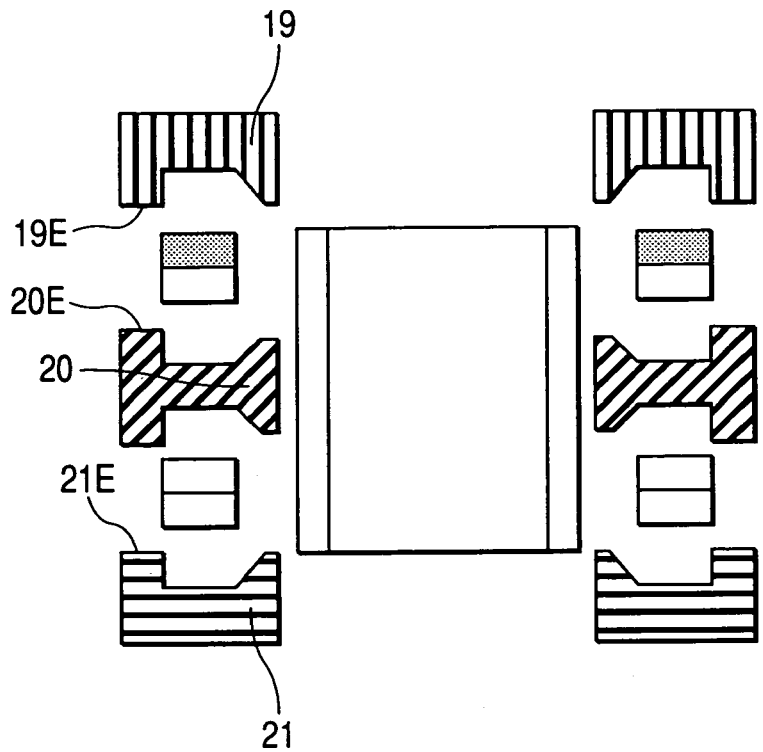
FIG. 18 is an exploded view of another example of the 3-phase brushless motor before assembly thereof according to the embodiment of the present invention.

In a concrete manufacturing for the AC motor, one factor causing the cogging torque and torque ripple is reluctance or magnetic resistance generated in divided parts of the AC motor. There are various manners to realize the configuration of the stator of the AC motor according to the present invention. FIG. 18 shows a typical example of the configuration in which the stator pole of each phase is divided to plural parts in axis direction and the divided parts of the stator pole are assembled through windings.

Figure 19:
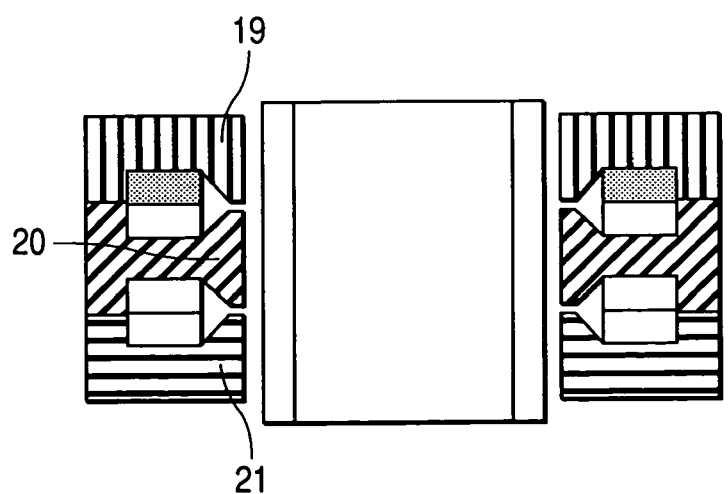
FIG. 19 is a sectional view of the 3-phase brushless motor shown in FIG. 18 after assembly thereof.

When the stator core has the configuration shown in FIG. 18, the opposite faces 19E, 20E, and 21E (on the outer circumference surface of the stator shown in FIG. 18) become the reluctance or the magnetic resistance elements. Through the opposite faces 19E, 20E, and 21E (on the outer circumference surface of the stator shown in FIG. 18), the opposite faces of the divided parts of the stator are mated to each other as shown in FIG. 19, In this case, the reluctance of the entire of the 3-dimensional magnetic flux path is increased, and the output torque is thereby decreased. Because the divided parts have the different number of windings passing through thereof in the brushless AC motor of the embodiment, the unbalance of the magnetic flux thereby occurs even if each divided stator core has a same reluctance as the magnetic resistance. The unbalance generates the cogging torque and torque ripple. Because it is extremely difficult to manufacture each divided part with a same reluctance or to set the reluctance to optimum value so that the unbalance of change of the magnetic flux in each phase can be eliminated, the optimum manner is to reduce the reluctance of each divided part as small as possible in order to eliminate the unbalance of change of the magnetic flux in each divided part.

One possible manner is to increase each area of the opposite faces 19E, 20E, and 21E of the divided parts 19, 20, and 21 of the stator core as large as possible without increasing the entire size of the AC motor.

Figure 20:
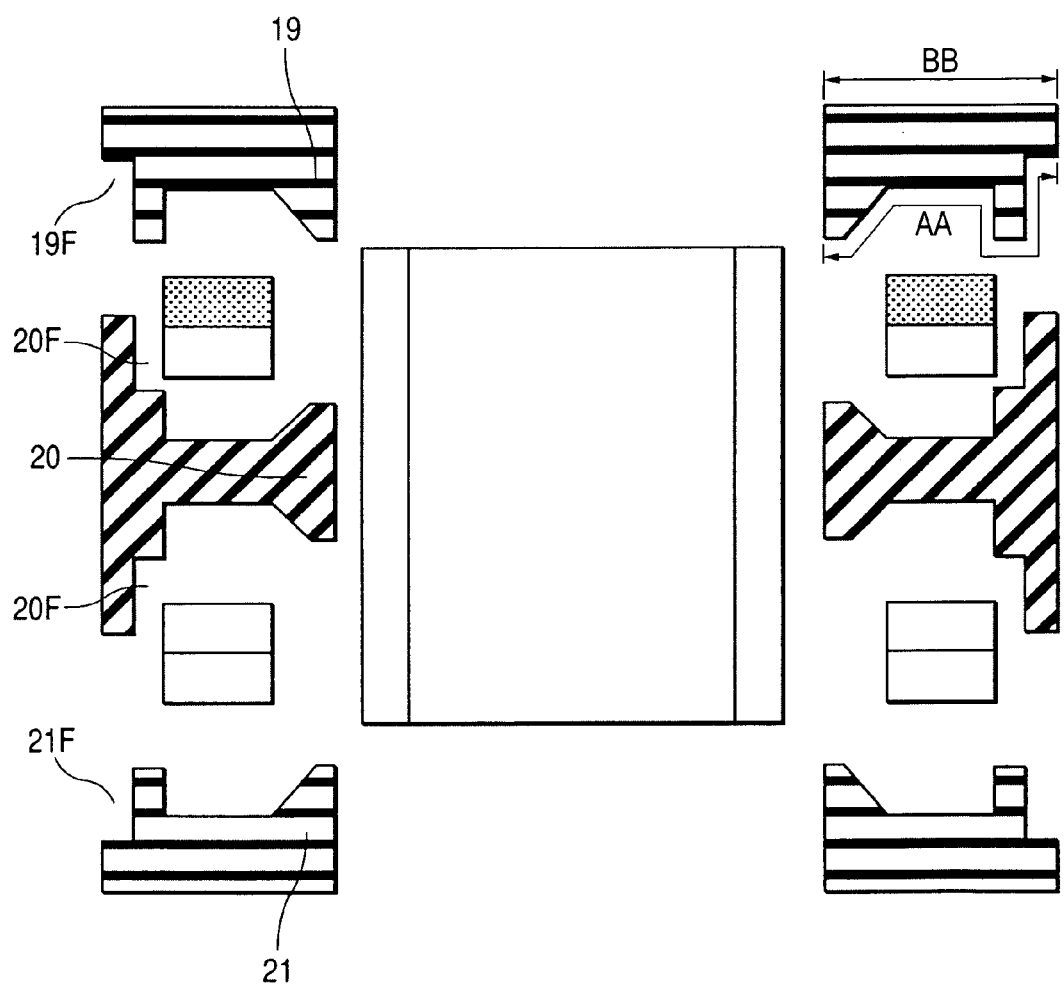
FIG. 20 is an exploded view of another example of the 3-phase brushless motor before assembly thereof according to the embodiment of the present invention.
Figure 21:
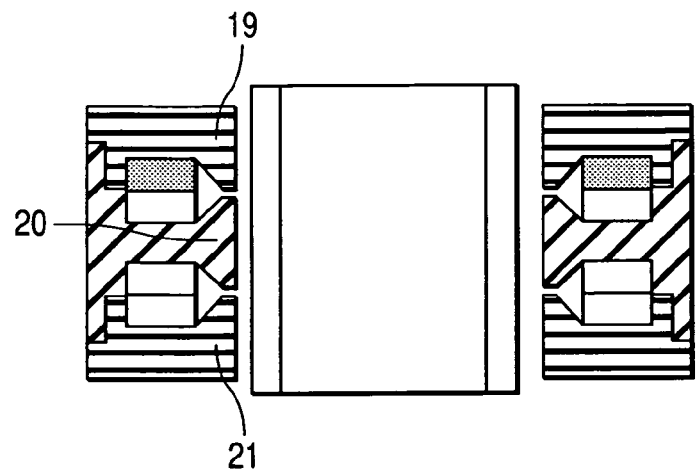
FIG. 21 is a sectional view of the 3-phase brushless motor shown in FIG. 20 after assembly thereof.

FIG. 20 shows an example to realize the above possible manner. As shown in FIG. 20, the divided parts 19 and 21 of the stator core have step parts 19F and 21F formed at the outer periphery thereof, respectively. Further, the divided stator part 20 has step parts 20F formed at both ends of its outer periphery. The step parts 20F of the divided status core 20 are mated with the corresponding step parts 19F and 21F of the divided stator cores 19 and 21 shown in FIG. 21. However, the present invention is not limited by this shape of the step parts 19F, 20F, and 21F shown in FIG. 20, it is acceptable to form the step parts having another shape unless the area of each opposite face is increased while keeping the entire size of the AC motor. As shown in FIG. 20, a total surface area "AA" of each divided stator facing a surface of an adjacent divided stator that is greater than a sectional area "BB" of each divided stator.

Figure 22:
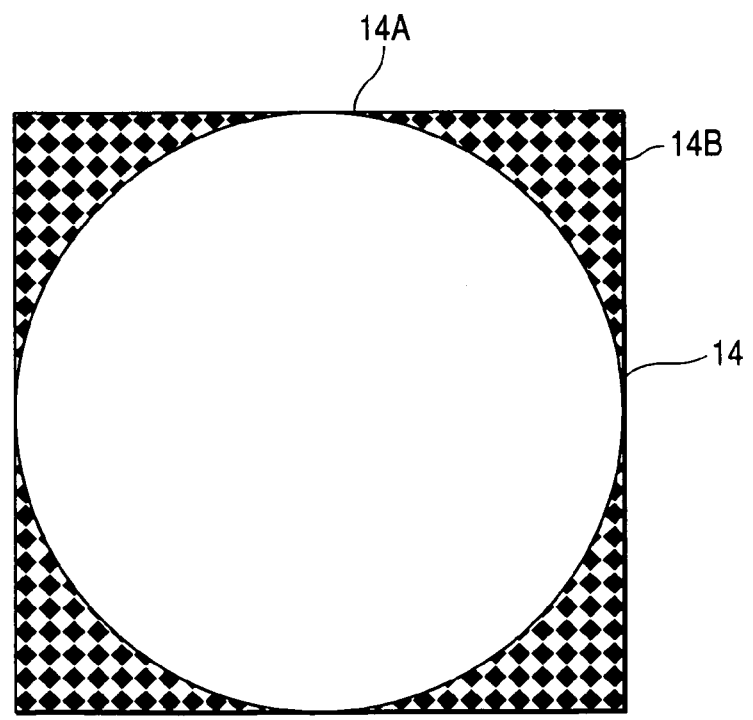
FIG. 22 is a plan view of a mating surface of the stator of another example of the 3-phase brushless motor according to the embodiment of the present invention.

As shown in FIG. 22, it is further possible to increase the area of the opposite faces of the stator core by using the configuration in which only the opposite face 14B of the stator core 14 is formed in a rectangle shape. The opposite face 14B is larger in area than the outer periphery 14A of the cylinder shaped part of the stator core 14. Because a usual AC motor has the magnetic flux paths generated on the surface vertically to the axis direction of the rotor, the possible manner described above causes the unbalance state of the magnetic flux between the stator poles. However, because the magnetic flux flows in the axis direction at the opposite faces in the brushless AC motor having the above configuration according to the present invention, any unbalance does not occur.

Features and Effects of the Present Invention

As described above, the present invention provides an AC motor having a rotor, a stator, and plural loop-configuration stator windings. The rotor has a plurality of magnetic poles, with alternating N (north) poles and S (south) poles circumferentially disposed at equal intervals. The stator has N stator pole groups, where N is a plural integer. Each stator pole group is formed circumferentially on the stator, and each stator pole group has a plurality of stator poles, with each of adjacent pairs of the N stator pole groups mutually differing in circumferential position by an identical amount. The plural loop-configuration stator windings is formed circumferentially on the stator, with each the loop-configuration stator winding disposed immediately adjacent to a corresponding one of the N stator pole groups, with respect to an axial direction of the rotor. In the AC motor, an opposite face of the stator poles faced to the magnetic poles of the rotor is formed with an area having a distribution for smoothing a change rate of rotation of a magnetic flux flowing through the stator poles.

In the AC motor of the present invention, the windings of the loop-configuration are arranged or placed on a surface vertically to the axial direction of the rotor, and a magnetic path passing from the surface of the stator poles of a phase to the surface of the stator poles of another phase is formed in a 3-dimension space through the outer circumference of the stator. This configuration can provide the AC motor without any protrusive part of the windings in axial direction, namely eliminate any protrusive part of the windings in axis direction, and reduces the reluctance or magnetic resistance corresponding to the protrusive part. It is thereby possible to manufacture the AC motor with a compact size.

On assumption that the magnetic flux flows in a 3-dimensional space in the AC motor having the above configuration, it is possible to freely design the surface shape of the stator poles. Further, because the area of the stator poles faced to the rotor has a distribution for smoothing the change ratio of rotation of the magnetic flux passing through the stator poles, it is possible to reduce cogging torque and torque ripple.

Further, according to another aspect of the present invention, each stator pole has an approximate parallelogram-shaped configuration in which the top side and the bottom side of the stator pole is same in length and they are shifted in its rotational direction. The stator pole having the configuration can be easily manufactured. The 60 degree shifting in rotational direction provides the maximum magnetic flux and the smallest higher-harmonic component in the change rate of the magnetic flux. Another degree shifting in rotational direction has effect to reduce cogging torque and torque ripple.

Still further, according to another aspect of the present invention, it is possible to have a large sectional area of the magnetic path passing the surface of the stator pole and the outer circumferential of the stator while keeping the total area of the stator poles by the configuration of combining the stator poles of the approximate parallelogram shape and approximate trapezoid shape. In the configuration, because the area of the stator pole of the approximate parallelogram shape is not changed, it is necessary to increase the area of the magnetic path in the stator pole of the approximate parallelogram shape in axis direction in order to keep the valance of the stator poles of both shapes.

Furthermore, according to another aspect of the present invention, it is necessary to relieve edge parts of each stator pole with chamfer or with radius in order to approaches a sine-wave shape of the stator pole. In particular, it is possible to reduce cogging torque and torque ripple by rounding at least two corners of the stator pole because those two corner closed to the center of the stator pole have different in configuration from the sine-wave shape.

Still further, according to another aspect of the present invention, it is possible to prevent, by cutting a part of the stator pole, the case in which the surface of the stator pole becomes an extreme oblong shape when the stator pole has a long side in axis direction and the number of poles is large. This configuration and manner can solve the drawback of a difficulty to maintain the strength of the surface of the stator pole and a difficulty to form the magnetic path from the surface of the stator pole to a winding section.

Further, according to another aspect of the present invention, it is possible to reduce the length of the stator pole in axis direction while keeping the change rate of magnetic flux in each phase when the stator poles of each phase are cut by a same area.

Still further, according to another aspect of the present invention, it is possible to equal the amount of magnetic leakage flux between adjacent stator poles in each phase by setting the length of the area having the minimum air gap between adjacent stator poles. This manner can reduce cogging torque and torque ripple caused by unbalance of the magnetic leakage flux in the 3-phases. It is preferred to form the length of the air gap and the area of the opposite faces between the adjacent stator poles as small as possible in order to reduce the magnetic leakage flux and to increase the output torque of the AC motor.

Further, according to another aspect of the present invention, it is preferred to form the surface area of each stator pole with a same area.

Still further, according to another aspect of the present invention, it is possible to reduce the magnetic leakage flux generated between adjacent stator poles and the phenomenon of roundabout way of the magnetic flux in a 3-dimensional space by forming the rotor whose length is longer in axis direction than that of the stator. This can determine the magnitude of the magnetic flux only by the surface area of the stator pole. The change rate of magnetic flux at the top side and the bottom side of the stator pole can be considered, like the change rate of magnetic flux in the other part of the stator pole. It is thereby possible to design an AC motor having a small cogging torque and torque ripple with a simple configuration.

Still further, the concept of the present invention is applicable to an AC motor having a rotor whose opposite side faced to the stator is longer in length than that of the stator.

Furthermore, according to another aspect of the present invention, it is possible to eliminate the magnetic leakage flux generated between the rotor and a part of the stator which is longer in length than the rotor by forming the longer part more than twice of the width of an air gap between the stator and the rotor.

Still further, the concept of the present invention is applicable to an AC motor having a reduced number of stator poles. In the prior art, it is difficult to have a large air gap between adjacent stator poles when an AC motor is a small size or has a large number poles. In order to solve the conventional drawback, it is necessary to have a large air gap between adjacent stator poles. However, when a large air gap is formed between adjacent stator poles without reducing the number of poles, it is necessary to reduce the width of each stator pole. This reduces the output torque of the AC motor. On the contrary, according to the AC motor of the present invention, when the number of poles is reduced in half, it is possible to have adequately the width of an air gap between adjacent stator poles and there is thereby no necessary to reduce the width of the air gap. When the number of poles is reduced in half, it is required to increase the output torque generated per stator pole twice. However, it is adequately possible to increase the output torque more than twice when the stator has a small inner radius and the number of poles. For example, it is possible to have the same effect when the stator poles adjacent to each other are formed with the interval of electrical angle of 240 degrees.

Thus, it is possible to reduce cogging torque and torque ripple by shifting the position of the stator pole in rotational direction if the air gap between adjacent stator poles is set to adequate width. On shifting it by 30 degrees, it is possible to reduce cogging torque and torque ripple without reducing the output torque.

Still further, according to the present invention, it is possible to form the area of opposite faces of the divided stator cores, to be mated to each other, as large as possible.

In a concrete manufacturing for the AC motor, one factor causing the cogging torque and torque ripple is reluctance or magnetic resistance generated in divided parts of the AC motor. When the stator core of the AC motor has such a configuration made of the plural divides stator cores, the opposite faces become the reluctance or the magnetic resistance elements. In this case, the reluctance of the entire of the 3-dimensional magnetic flux path is increased, and the output torque is thereby decreased.

Further, because the divided parts have the different number of windings passing through thereof in the brushless AC motor of the present invention, the unbalance of the magnetic flux thereby occurs even if each divided stator core has a same reluctance.

The unbalance generates cogging torque and torque ripple even if each divided part has a same reluctance or magnetic resistance. Because it is extremely difficult to manufacture each divided part with a same reluctance or to set the reluctance to optimum value so that the unbalance of change of the magnetic flux in each phase can be eliminated, the optimum manner is to reduce the reluctance of each divided part as small as possible in order to eliminate the unbalance of change of the magnetic flux in each divided part. One possible manner is to increase each area of the opposite faces of the divided parts of the stator core as large as possible without increasing the entire size of the AC motor. However, the present invention is not limited by the embodiment having the divided parts as shown in the diagrams. It is acceptable to form the divided stator cores having various shaped opposite faces whose area is set as large as possible while keeping the entire side of the AC motor.

Moreover, according to another aspect of the present invention, it is possible to increase the total area of the opposite faces by forming the opposite faces of the stator core larger in area than the outer periphery of the cylinder shaped part of the stator core. Because a usual AC motor has the magnetic flux paths generated on the surface vertically to the axis direction of the rotor, the possible manner described above causes the unbalance state of the magnetic flux between the stator poles. However, because the magnetic flux flows in the axis direction at the opposite faces in the brushless AC motor having the above configuration according to the present invention, any unbalance does not occur.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. An AC motor comprising:
   a rotor having a plurality of magnetic poles, with alternating north poles and south poles circumferentially disposed at equal intervals;
   a stator having three stator pole groups, each stator pole group formed circumferentially on the stator, with each of adjacent pairs of the three stator pole groups mutually differing in circumferential position by an identical amount; and
   a plurality of loop-configuration stator windings formed circumferentially on the stator, with each the loop-configuration stator winding disposed immediately adjacent to only one of the three stator pole groups, with respect to an axial direction of the rotor,
   wherein (−Iu+Iv) current is applied to one of the two stator windings enclosed by the stator pole groups adjacent to each other, and (−Iv+Iw) current is applied to the other of the two stator windings, where Iu, Iv and Iw are three phase AC currents that successively differ in phase by 120 degrees and flow in the loop-configuration stator windings, and
   wherein the stator poles facing the magnetic poles of the rotor have a combination of the stator poles of an approximate parallelogram shape and the stator poles of an approximate trapezoid shape, in which the top and bottom sides of each stator pole of the approximate parallelogram shape in its axial direction have a same width in a rotational direction of the rotor, and the top and bottom sides of each stator pole of the approximate trapezoid shape in its axial direction have a different width in the rotational direction of the rotor, and each stator pole of the approximate parallelogram shape and each stator pole of the approximate trapezoid shape have a same length in the axial direction.

2. The AC motor according to claim 1, wherein at least two corners of each stator pole, closed to a center thereof and faced to the rotor, have a rounded or chamfered shape.

3. The AC motor according to claim 1, a part of each stator pole is cut.

4. The AC motor according to claim 3, wherein corner areas near to a center of the stator pole having the approximate parallelogram shape are cut and an area of one side having a short width in the rotational direction of the stator pole having the approximate trapezoid shape.

5. The AC motor according to claim 4, wherein a minimum air gap between adjacent stator poles has an approximate same length in all of the stator group.

6. The AC motor according to claim 4, wherein the stator poles facing the rotor have an approximate same surface area.

7. The AC motor according to claim 3, wherein in the surface of the rotor facing the surface of the stator through an air gap, an axial length of the rotor is longer in an axial direction than an axial length of the stator, and
   in the surface other than the surface of the rotor facing the surface of the stator through the air gap, the axial length of the rotor is not more in the axial direction than the axial length of the stator.

8. The AC motor according to claim 3, wherein the stator comprises a plurality of divided stators, each stator pole is formed on each divided stator, and a total surface area of each divided stator facing a surface of an adjacent divided stator is greater than a sectional area of each divided stator.

9. The AC motor according to claim 1, wherein in the surface of the rotor facing the surface of the stator through an air gap, an axial length of the rotor is longer in an axial direction than an axial length of the stator, and in the surface other than the surface of the rotor facing the surface of the stator through the air gap, the axial length of the rotor is not more in the axial direction than the axial length of the stator.

10. The AC motor according to claim 9, wherein in the axial direction, the length of the stator in an area is not less than the length of the rotor, wherein the area is apart in a radial direction from the rotor by not less than two times a width of the air gap.

11. The AC motor according to claim 1, wherein the stator comprises a plurality of divided stators, each stator pole is formed on each divided stator, and a total surface area of each divided stator facing a surface of an adjacent divided stator is greater than a sectional area of each divided stator.

12. The AC motor according to claim 1, wherein mated surfaces of adjacent divided stators are formed with an approximate square shape.

* * * * *